US012697739B2

(12) United States Patent
Ogata et al.

(10) Patent No.: US 12,697,739 B2
(45) Date of Patent: Aug. 4, 2026

(54) DRIVING APPARATUS, CONTROL METHOD, ROBOT, RECORDING MEDIUM, AND METHOD OF MANUFACTURING PRODUCTS

(71) Applicant: CANON KABUSHIKI KAISHA, Tokyo (JP)

(72) Inventors: Masaru Ogata, Tokyo (JP); Junichi Fukuda, Kanagawa (JP); Yohji Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 18/829,065

(22) Filed: Sep. 9, 2024

(65) Prior Publication Data

US 2025/0091226 A1 Mar. 20, 2025

(30) Foreign Application Priority Data

Sep. 19, 2023 (JP) ................................. 2023-151610

(51) Int. Cl.
B25J 13/08 (2006.01)
B25J 9/10 (2006.01)

(52) U.S. Cl.
CPC ............. B25J 13/085 (2013.01); B25J 9/108 (2013.01)

(58) Field of Classification Search
CPC . B25J 13/085; B25J 9/108; B25J 9/102; B25J 9/126; B25J 17/00; H02K 5/161; H02K 11/24
USPC ........................................................ 700/258
See application file for complete search history.

(56) References Cited

U.S. PATENT DOCUMENTS

| | | | |
|---|---|---|---|
| 2012/0065902 A1 | 3/2012 | Nakajima | |
| 2015/0343639 A1* | 12/2015 | Hirano | B25J 15/02 |
| | | | 700/117 |
| 2016/0263749 A1* | 9/2016 | Ogata | B25J 13/085 |
| 2019/0009417 A1* | 1/2019 | Ogata | B25J 19/0029 |
| 2019/0366537 A1* | 12/2019 | Nakajima | F16H 19/005 |
| 2020/0306994 A1* | 10/2020 | Brudniok | F16H 25/2021 |
| 2025/0010463 A1* | 1/2025 | Riedel | G05B 19/423 |

FOREIGN PATENT DOCUMENTS

| | | |
|---|---|---|
| JP | H05-223665 | 8/1993 |
| JP | 2012-242114 | 12/2012 |
| JP | 2014-050926 | 3/2014 |
| JP | 2021-000676 | 1/2021 |

OTHER PUBLICATIONS

U.S. Appl. No. 18/762,462, filed Jul. 2, 2024.
U.S. Appl. No. 18/829,014, filed Sep. 9, 2024.
Extended European Search Report dated Jan. 17, 2025 in counterpart EP Application No. 24199638.8.

* cited by examiner

*Primary Examiner* — Kira Nguyen
(74) *Attorney, Agent, or Firm* — Venable LLP

(57) ABSTRACT

A driving apparatus is configured to displace a second link with respect to a first link. The driving apparatus includes a driving portion including an output portion configured to output a driving force that displaces the second link, a sensor configured to obtain information on force, a connection member configured to connect the output portion and the sensor, a first bearing, and a second bearing. The sensor is connected between the second link and the connection member. The first bearing and the second bearing are connected to the connection member for displacing the second link with respect to the first link.

19 Claims, 11 Drawing Sheets

203OES

203E

203OE

203OED

203IF1

FIG.8A                    FIG.8B
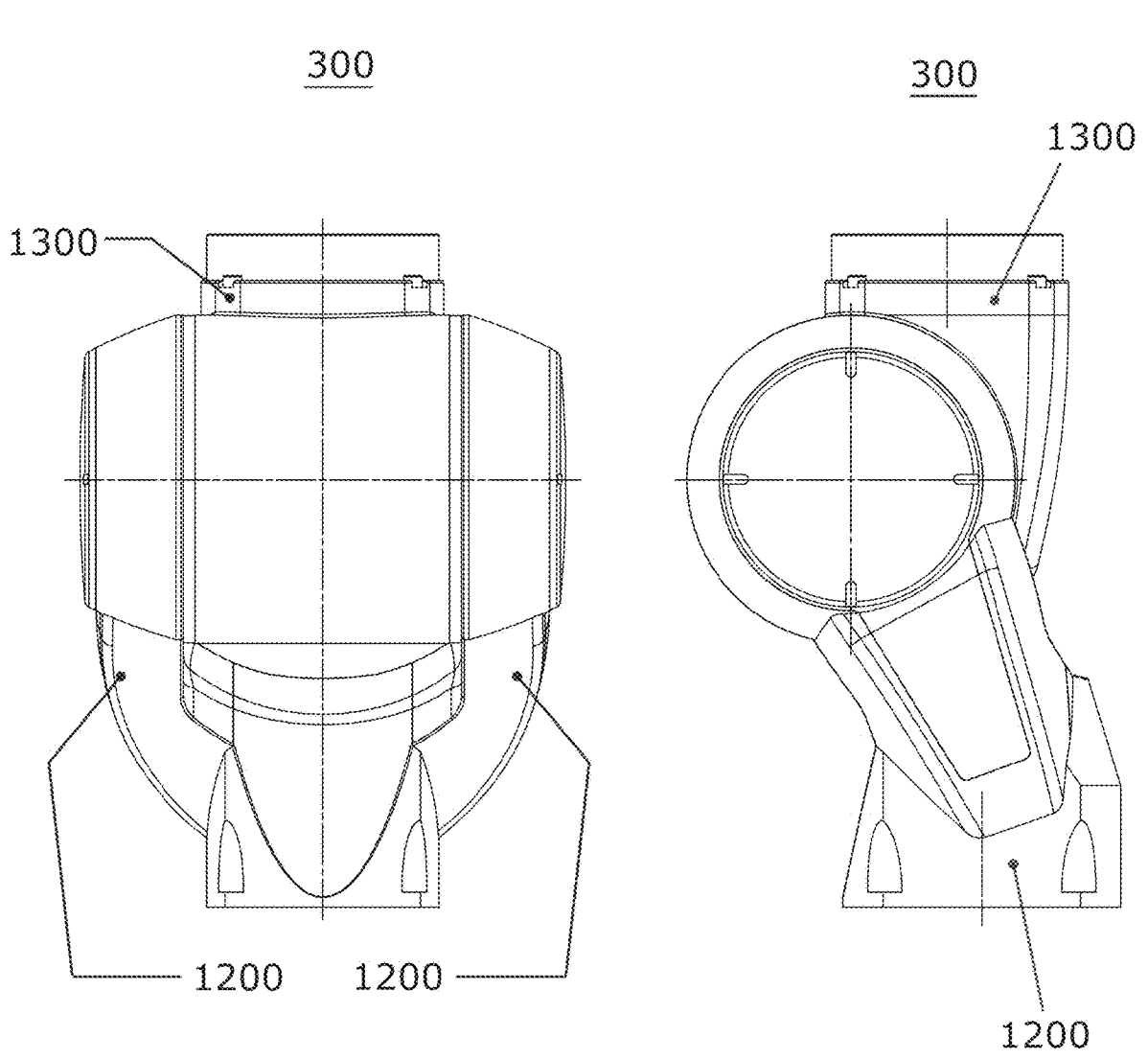

500

1500

1400

500

1500

1400

DRIVING APPARATUS, CONTROL METHOD, ROBOT, RECORDING MEDIUM, AND METHOD OF MANUFACTURING PRODUCTS

BACKGROUND OF THE INVENTION

Field of the Invention

The present invention relates to a driving apparatus that is used in a robot and includes a torque sensor.

Description of the Related Art

In recent years, an articulated robot manipulator has been increasingly used, and has been increasingly applied to fields, such as collaborative work with humans and assembly work in factories, in which a robot manipulator is required to perform flexible motion. Since such a robot is required to have a stable and broad-band force control function for adapting to external force, a control system based on torque control (torque servo) of joints is preferably used, instead of a motion control system based on position control (positional servo) of the joints. Thus, a joint mechanism that can accurately detect the torque to be outputted is required.

In general, the measuring mechanism (torque sensor) for the output torque is disposed between the output side of a driving portion, which is constituted by a motor and a reduction mechanism, and an output link. The torque sensor includes an elastic member that deforms in accordance with the torque applied to the elastic member, and it measures the output torque by detecting the amount of deformation or distortion of the elastic member. In addition, the output link is supported via a plurality of bearings for ensuring the mechanical robustness and the stable motion of the joint.

Japanese Patent Application Publication No. 2012-242114 describes a joint mechanism that includes a torque sensing mechanism for measuring the torque outputted by a driving portion. The joint mechanism includes a first link that is a base-end-side link, and a second link that is a distal-end-side link; and the second link is supported via a plurality of bearings.

SUMMARY OF THE INVENTION

According to a first aspect of the present invention, a driving apparatus is configured to displace a second link with respect to a first link. The driving apparatus includes a driving portion including an output portion configured to output a driving force that displaces the second link, a sensor configured to obtain information on force, a connection member configured to connect the output portion and the sensor, a first bearing, and a second bearing. The sensor is connected between the second link and the connection member, and the first bearing and the second bearing are connected to the connection member for displacing the second link with respect to the first link.

According to a second aspect of the present invention, a method of controlling a driving apparatus that displaces a second link with respect to a first link, includes controlling, by a control portion, a driving portion, based on an information on force obtained by a sensor. The driving apparatus includes the driving portion including an output portion configured to output a driving force that displaces the second link, the sensor configured to obtain information on force, a connection member configured to connect the output portion and the sensor, a first bearing, and a second bearing. The sensor is connected between the second link and the connection member, and the first bearing and the second bearing are connected to the connection member for displacing the second link with respect to the first link.

According to a third aspect of the present invention, a robot configured to displace a second link with respect to a first link, includes a driving portion including an output portion configured to output a driving force that displaces the second link, a sensor configured to obtain information on force, a connection member configured to connect the output portion and the sensor, a first bearing, and a second bearing. The sensor is connected between the second link and the connection member, and the first bearing and the second bearing are connected to the connection member for displacing the second link with respect to the first link.

According to a fourth aspect of the present invention, a method of controlling a robot that displaces a second link with respect to a first link, includes controlling, by a control portion, a driving portion, based on an information on force obtained by a sensor. The robot includes the driving portion including an output portion configured to output a driving force that displaces the second link, the sensor configured to obtain information on force, a connection member configured to connect the output portion and the sensor, a first bearing, and a second bearing. The sensor is connected between the second link and the connection member, and the first bearing and the second bearing are connected to the connection member for displacing the second link with respect to the first link.

Further features of the present invention will become apparent from the following description of exemplary embodiments with reference to the attached drawings.

BRIEF DESCRIPTION OF THE DRAWINGS

FIG. 3A is a front view for illustrating an external shape of a joint mechanism 200.

FIG. 3B is a side view for illustrating the external shape of the joint mechanism 200.

FIG. 8A is a front view for illustrating an external shape of a joint mechanism 300.

FIG. 8B is a side view for illustrating the external shape of the joint mechanism 300.

DESCRIPTION OF THE EMBODIMENTS

In Japanese Patent Application Publication No. 2012-242114, the second link that serves as an output link is supported via a plurality of bearings. However, there is a case in which the torque outputted by the driving portion cannot be detected with high accuracy, by the torque sensor. Thus, the accuracy of control for driving the joint by using the torque control (torque servo) cannot be increased sufficiently, making it difficult to achieve a robot that performs precision assembly work.

For this reason, it has been desired to achieve a technique that can detect the torque applied to the output link, with high accuracy in a case where the output link is supported via a plurality of bearings.

The present inventors have studied the case where the torque applied to the output link cannot be detected with high accuracy in the conventional joint mechanism in which the output link is supported via a plurality of bearings, and they have found the reason. That reason will first be described with reference to a reference embodiment.

Reference Embodiment

Figure 11:
FIG. 11 is a schematic cross-sectional view of a joint mechanism 3000 of a reference embodiment, taken along a rotation center axis 3220.

FIG. 11 is a schematic cross-sectional view of a joint mechanism 3000 of the reference embodiment, taken along a rotation center axis 3220 of an output link (i.e., a second link 3200). The joint mechanism 3000 includes a first link 3100, the second link 3200, a first bearing mechanism 3211, a second bearing mechanism 3212, a driving portion 3202, and a torque sensor 3203.

The first link 3100 is a fixed-end-side link linked to a base-portion side of the robot arm, and the second link 3200 corresponds to a distal-end-side link, or an output link, rotated by the driving portion 3202. The driving portion 3202 includes an electric motor including a stator 3202S and a rotor 3202R, and a reduction mechanism. The stator 3202S of the electric motor is fixed to the first link 3100.

The output side of the driving portion 3202 (i.e., the output side of the reduction mechanism) is connected to one end of the torque sensor 3203, and the other end of the torque sensor 3203 is connected to the second link 3200. The rotation torque outputted by the driving portion 3202 is transmitted to the second link 3200 via the torque sensor 3203.

The first bearing mechanism 3211 is disposed between the first link 3100 and the output side of the driving portion 3202, and it supports the output side of the driving portion 3202 with respect to the first link 3100 such that the output side of the driving portion 3202 and the first link 3100 can rotate relative to each other. The second bearing mechanism 3212 is disposed between the first link 3100 and the second link 3200, and it supports the second link 3200 with respect to the first link 3100 such that the first link 3100 and the second link 3200 can rotate relative to each other. For mechanically firmly supporting the second link 3200 with respect to the first link 3100, the first bearing mechanism 3211 and the second bearing mechanism 3212 are spaced from each other when viewed along the rotation center axis 3220 and form a so-called double-ends-supported structure.

In FIG. 11, arrows are schematically illustrated for showing how the force is transmitted when a torque (moment) T is applied to the second link.

In FIG. 11, arrows are schematically illustrated for showing how the force is transmitted when a torque (moment) T is applied to the second link.

Each of arrows T1 and T2 schematically illustrates a transmission path along which the torque T applied to the second link 3200 is transmitted to the first link 3100. The torque T applied to the second link 3200, that is, the torque T to be measured and controlled can be transmitted to the first link 3100 via two transmission paths: a first transmission path T1 and a second transmission path T2. Specifically, the first transmission path T1 is a path along which the torque T is transmitted to the first link 3100 through the torque sensor 3203, the first bearing mechanism 3211, and the driving portion 3202. In addition, the second transmission path T2 is a path along which the torque T is transmitted from the second link 3200 to the first link 3100 through the second bearing mechanism 3212.

In the second transmission path T2, the second bearing mechanism 3212 that can rotate freely is interposed between the second link 3200 and the first link 3100. Thus, the torque transmitted through the second transmission path T2 is ideally zero, and it does not affect the force transmitted to the torque sensor 3203 through the first transmission path T1. In actuality, however, the resistance (running torque), the friction torque, and the like are produced as reaction force moment ($T_{loss}$). The resistance (running torque) is produced by the rotation of the second bearing mechanism 3212, and the friction torque is produced in accordance with the external-force torque when the second bearing mechanism 3212 is in a stop state. Thus, not all the torque T required to be measured is transmitted to the torque sensor 3203 through the transmission path T1, and the torque transmitted to the torque sensor 3203 is decreased by the reaction force moment ($T_{loss}$) produced in the second bearing mechanism 3212. If the torque that can be measured by the torque sensor 3203 is denoted by $T_{ts}$, $T_{ts}=T-T_{loss}$. Thus, an area (dead zone) which corresponds to the reaction force moment ($T_{loss}$) and in which the torque sensor 3203 cannot measure the torque is produced.

Thus, in the joint mechanism as in the reference embodiment, the torque applied to the output link cannot be measured accurately by the torque sensor included in the joint. As a result, the sensitivity in the torque control and the responsivity of the torque servo deteriorate. Thus, in the articulated robot that includes the joint mechanism, since the accuracy of controlling and measuring the force at the distal end of the robot arm deteriorates, it is difficult for the robot to perform work, such as precision assembly work, with high accuracy.

Embodiment

Hereinafter, a driving apparatus of an embodiment of the present invention will be described with reference to the accompanying drawings. Note that since the embodiment described below is merely an example, detailed configurations thereof may be modified as appropriate by a person skilled in the art without departing the spirit of the present invention.

Note that in the drawings that will be referred to in the description of the following embodiment, a component given an identical symbol has an identical function, unless otherwise specified. In addition, if a plurality of identical components is illustrated in a figure, the assignment of the symbol and the description thereof may be omitted.

In addition, there is a case in which a figure may be schematically illustrated for convenience of illustration and description. In this case, the shape, size, arrangement, and the like of a component illustrated in the figure may not necessarily be completely the same as those of the real component.

Joint Mechanism

Figure 1:
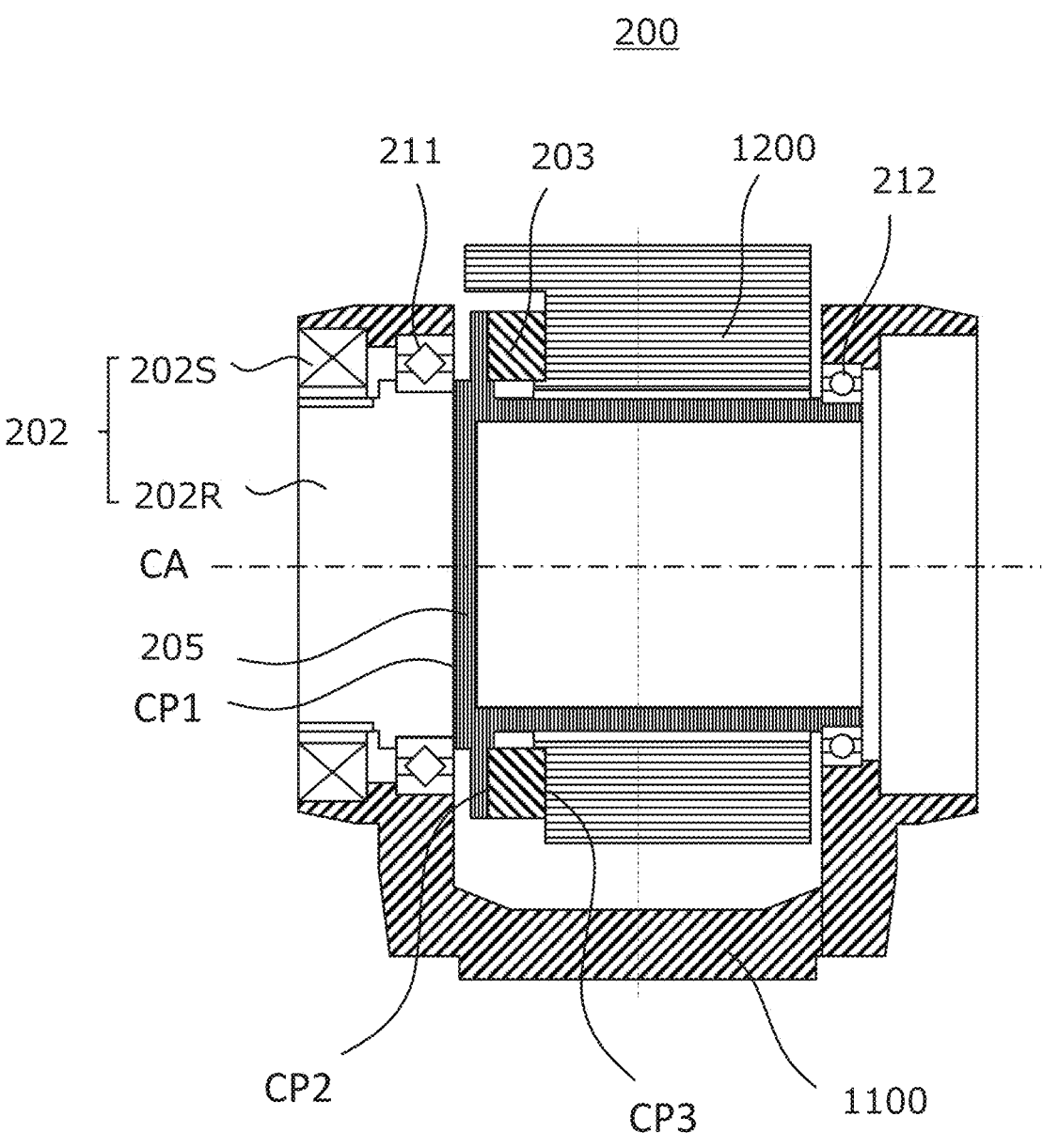
FIG. 1 is a schematic cross-sectional view for illustrating a joint mechanism of an embodiment.

FIG. 1 is a schematic cross-sectional view for illustrating a joint mechanism (i.e., a driving apparatus) of the embodiment; and illustrates a cross section of a joint mechanism 200, taken along a rotation center axis CA of the output link. The joint mechanism 200 includes a first link 1100, a second link 1200, a first bearing mechanism 211, a second bearing mechanism 212, a driving portion 202, and a torque sensor 203.

The first link 1100 is a fixed-end-side link linked to a base-portion side of the robot arm, and the second link 1200 corresponds to a distal-end-side link, or an output link, rotated by the driving portion 202. The second link 1200 can be displaced with respect to the first link, with the rotation center axis CA serving as a center of rotation.

The driving portion 202 includes an electric motor including a stator 202S and a rotor 202R, and a reduction mechanism. The stator 202S of the electric motor is fixed to the first link 1100.

The output side of the driving portion 202 (i.e., the output side of the reduction mechanism) is connected to a sensor connection member 205 via a connection portion CP1. The sensor connection member 205 is connected to one end of the torque sensor 203 via a connection portion CP2, and the other end of the torque sensor 203 is connected to the second link 1200 via a connection portion CP3. The rotation torque outputted by the driving portion 202 is transmitted to the second link 1200 via the torque sensor 203. For convenience of description, a portion of the torque transmission path on the driving portion 202 side with respect to the torque sensor 203 may be referred to as a driving-portion-side torque transmission path, and a portion of the torque transmission path on the second link 1200 side with respect to the torque sensor 203 may be referred to as an output-link-side torque transmission path.

The first bearing mechanism 211 is disposed (or held) between the first link 1100 and the output side of the driving portion 202, and supports the output side of the driving portion 202 with respect to the first link 1100 such that the output side of the driving portion 202 and the first link 3100 can rotate relative to each other. The second bearing mechanism 212 is disposed (or held) between the sensor connection member 205 and the first link 1100, and it supports the sensor connection member 205 with respect to the first link 3100 such that the sensor connection member 205 and the first link 1100 can rotate relative to each other. For mechanically firmly supporting the second link 1200 with respect to the first link 1100, the first bearing mechanism 211 and the second bearing mechanism 212 are spaced from each other when viewed along the rotation center axis CA and form a so-called double-ends-supported structure. That is, when viewed along the direction of the rotation axis, at least one portion of the second link is positioned between the first bearing and the second bearing. With this arrangement, the second link can be firmly supported with respect to the first link.

In the above-described reference embodiment, in the torque transmission path, the first bearing mechanism 3211 is disposed on the driving portion 3202 side with respect to the torque sensor 3203, and the second bearing mechanism 3212 is disposed on the output link side (i.e., on the second link 3200 side) with respect to the torque sensor 3203. As a result, the reaction force moment ($T_{loss}$) produced in the second bearing mechanism 3212 and included in the torque (moment) T applied to the second link 3200 is not transmitted to the torque sensor 3203, and it cannot be detected by the torque sensor 3203. That is, in the reference embodiment, since the bearing mechanism is disposed on the output-link-side torque transmission path, the reaction force moment ($T_{loss}$) produced in the bearing mechanism is not transmitted to the torque sensor, so that the torque applied to the output link cannot be detected accurately by the torque sensor.

In contrast, in the joint mechanism of the embodiment, both of the first bearing mechanism 211 and the second bearing mechanism 212, which form the double-ends-supported structure, are disposed on the driving-portion-side torque transmission path of the torque transmission path, and the bearing mechanisms are not disposed on the output-link-side torque transmission path. That is, the first bearing mechanism 211 and the second bearing mechanism 212 support members disposed on the driving portion side with respect to the torque sensor 203 in the torque transmission path. Thus, the torque applied to the second link 1200 is not decreased by the reaction force moment when the torque is transmitted to the torque sensor 203 via the connection portion CP3. As a result, the rotation torque applied to the output link (i.e., the second link 1200) can be detected with high accuracy, by the torque sensor 203.

In the joint mechanism of the embodiment, when viewed along the direction of the double-ends-supported structure, or the direction of the rotation axis, at least one portion of the second link is positioned between the first bearing and the second bearing. With this arrangement, the second link can be firmly supported with respect to the first link. In addition, the joint torque for driving the link can be measured and controlled with high sensitivity and high accuracy, without being affected by the reaction force (torque disturbance) produced in the bearing mechanism. If the joint mechanism of the embodiment is used, the responsivity of torque control for a robot, such as an articulated robot, can be increased, and it becomes possible to achieve a robot that can perform work, such as precision assembly work. In this case, it is not necessary to complicate the control of the robot. For example, it is not necessary to predetermine the reaction force, produced in the bearing, by conducting an experiment, and store the reaction-force data in the control portion of the robot, as correction data. In addition, it is not necessary to correct the driving force by causing the control portion to compute the reaction force, produced in the bearing, by using the bending angle and the bending speed of the joint. Thus, if the joint mechanism of the present embodiment is used, the torque of the joint mechanism can be controlled with high sensitivity and high accuracy, without using any complicated control method.

Robot Apparatus

Figure 2:
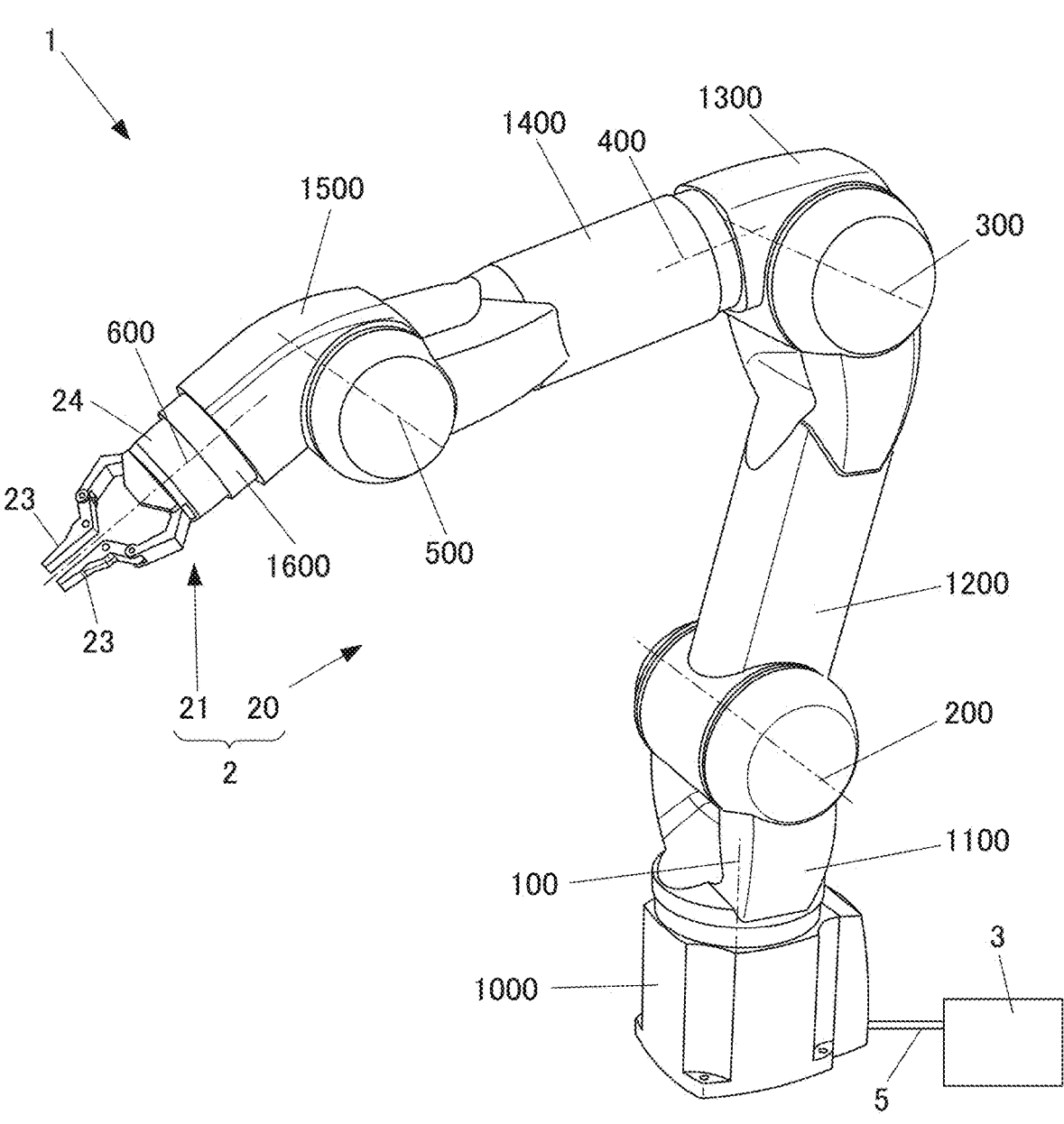
FIG. 2 illustrates one example of a robot that includes the joint mechanism of the embodiment.

Next, a robot apparatus that includes the joint mechanism of the embodiment will be described. FIG. 2 illustrates an external appearance of an articulated robot apparatus 1 that is one example of a robot that includes the joint mechanism of the embodiment.

The robot apparatus 1 includes a robot 2, and a control apparatus 3 that serves as a control portion that controls the robot 2. The robot 2 includes a vertically articulated robot arm 20 that includes a plurality of joint mechanisms (e.g., joint mechanisms 100 to 600), and a robot hand 21 that is an end effector.

The robot arm 20 includes a plurality of links (e.g., links 1000 to 1600), and one of the links 1000 to 1600 is linked with another link via a joint mechanism disposed on the base-end side of the one link. The joint mechanisms 100 to 600 may respectively be referred to as joints J1 to J6, disposed from the base-end side toward the distal-end side.

In the present embodiment, the robot arm 20 includes the six-axis joints J1 to J6; the three-axis joints J2, J3, and J5 are able to swing, and the three-axis joints J1, J4, and J6 are able to rotate. Note that being able to swing may be referred to as being able to pivot or bend.

The link 1000 that is the base end portion (base portion) of the robot arm 20 is fixed to a base stand. The links 1000 to 1600 are connected in series with each other by the joint mechanisms 100 to 600. Each joint includes a torque sensor disposed on the output side of the joint, for measuring the torque transmitted to a corresponding link via the joint.

The robot hand 21 that is an end effector is attached to and supported by the link 1600 disposed at the distal end of the robot arm 20. The motion (position and posture) and force (force and moment) of the robot hand 21 are adjusted by the motion of the robot arm 20. The robot hand 21 includes a hand body 24, and a plurality of fingers 23 disposed so as to move with respect to the hand body 24. The robot hand 21 can hold an object, such as a workpiece, by using the fingers 23.

The end effector is not limited to the robot hand 21 described as an example, and any one of various types of devices can be attached to the robot arm 20 in accordance with the work performed by the robot. For example, a peripheral apparatus (external expansion apparatus), such as a camera (hand eye) (not illustrated), a wrist multi-axis force sensor (force-and-torque sensor: F/T sensor), or a proximity sensor, may be mounted on a link disposed on the distal end side, or at the wrist portion, of the robot.

The robot 2 and the control apparatus 3 are connected with each other via a wiring member 5 that includes electric wires including signal lines and power lines. If the robot 2 includes an arm or an end effector that is moved by driving fluid (that is, by using air pressure, oil pressure, or the like), fluid pipes or the like may be included in the wiring member 5. The wiring member 5 has flexibility, and it is disposed so as to extend from the base end portion (fixed end) to the distal end portion (free end) of the robot arm 20. In addition, each of the electric wire and the pipe, which constitute the wiring member 5, is branched as appropriate; and is connected to an actuator or a sensor of the joints J1 to J6, or to an actuator, a sensor, or a peripheral apparatus of the robot hand 21.

The joint mechanism 200 that can swing has the configuration described with reference to FIG. 1. Similarly, each of the joint mechanisms 300 and 500, which can swing, also has the configuration similar to the configuration of the joint mechanism 200. Thus, in the joint mechanisms 200, 300, and 500, the link is firmly supported by the double-ends-supported structure, and the joint torque for driving the link can be measured and controlled with high sensitivity and high accuracy, without being affected by the reaction force (torque disturbance) produced in the bearing mechanism.

Detailed Description of Swing-Joint Mechanism

The basic configuration of the joint mechanisms 200, 300, and 500 that are included in the robot 2 and that can swing has been described above with reference to FIG. 1. In addition, the detailed description thereof will be made.

Figures 3A, 3B:
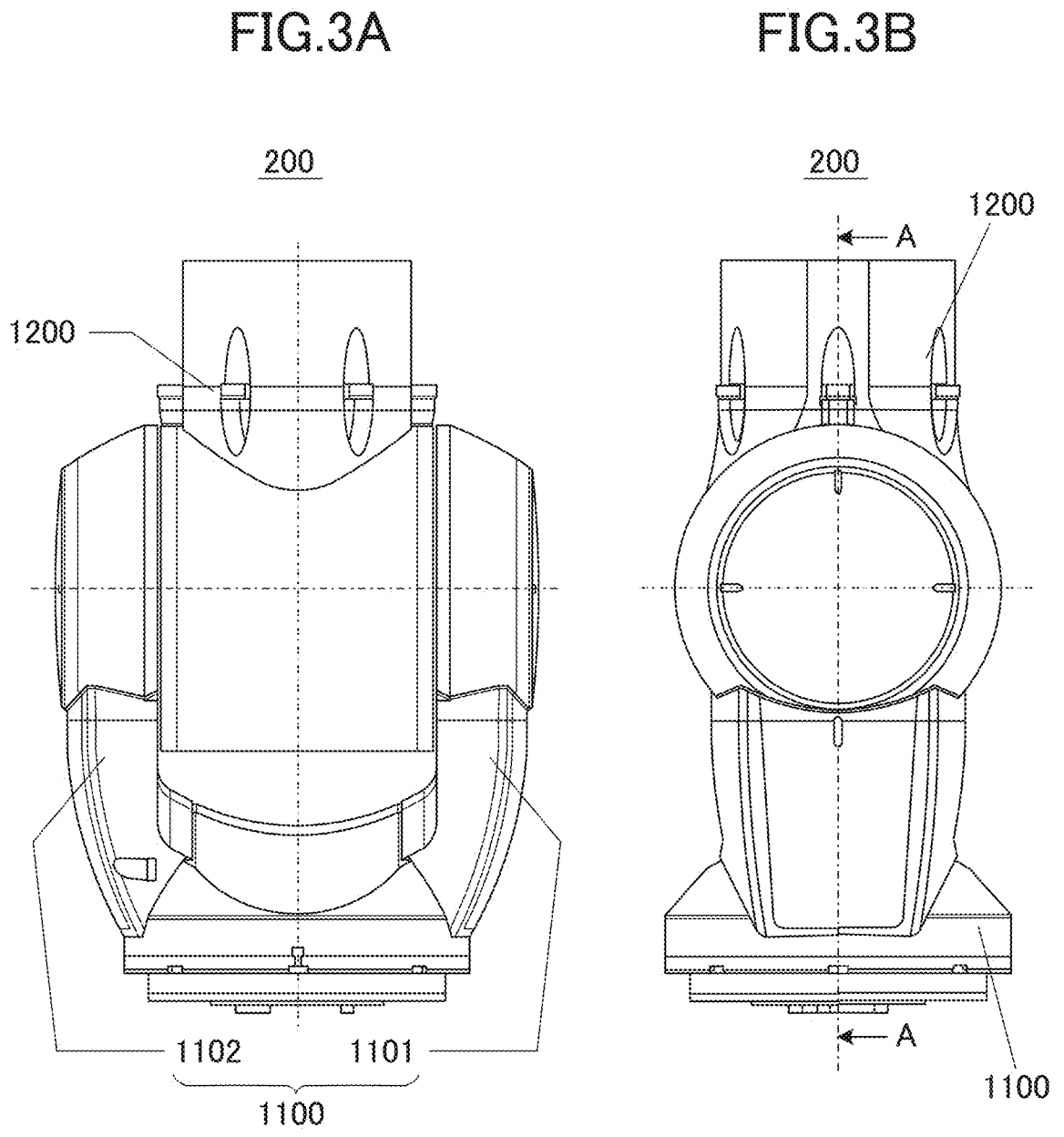

FIG. 3A is a front view for illustrating an external shape of the joint mechanism 200, and FIG. 3B is a side view for illustrating the external shape of the joint mechanism 200. The joint mechanism 200 of the joint J2 links the first link 1100 that is a fixed-end-side link, and the second link 1200 that is an output link positioned on the distal-end side. The first link 1100 includes a joint support member 1101 and a joint support member 1102; and causes the joint support member 1101 and the joint support member 1102 to support the side faces of the second link 1200, from both sides.

Figure 4:
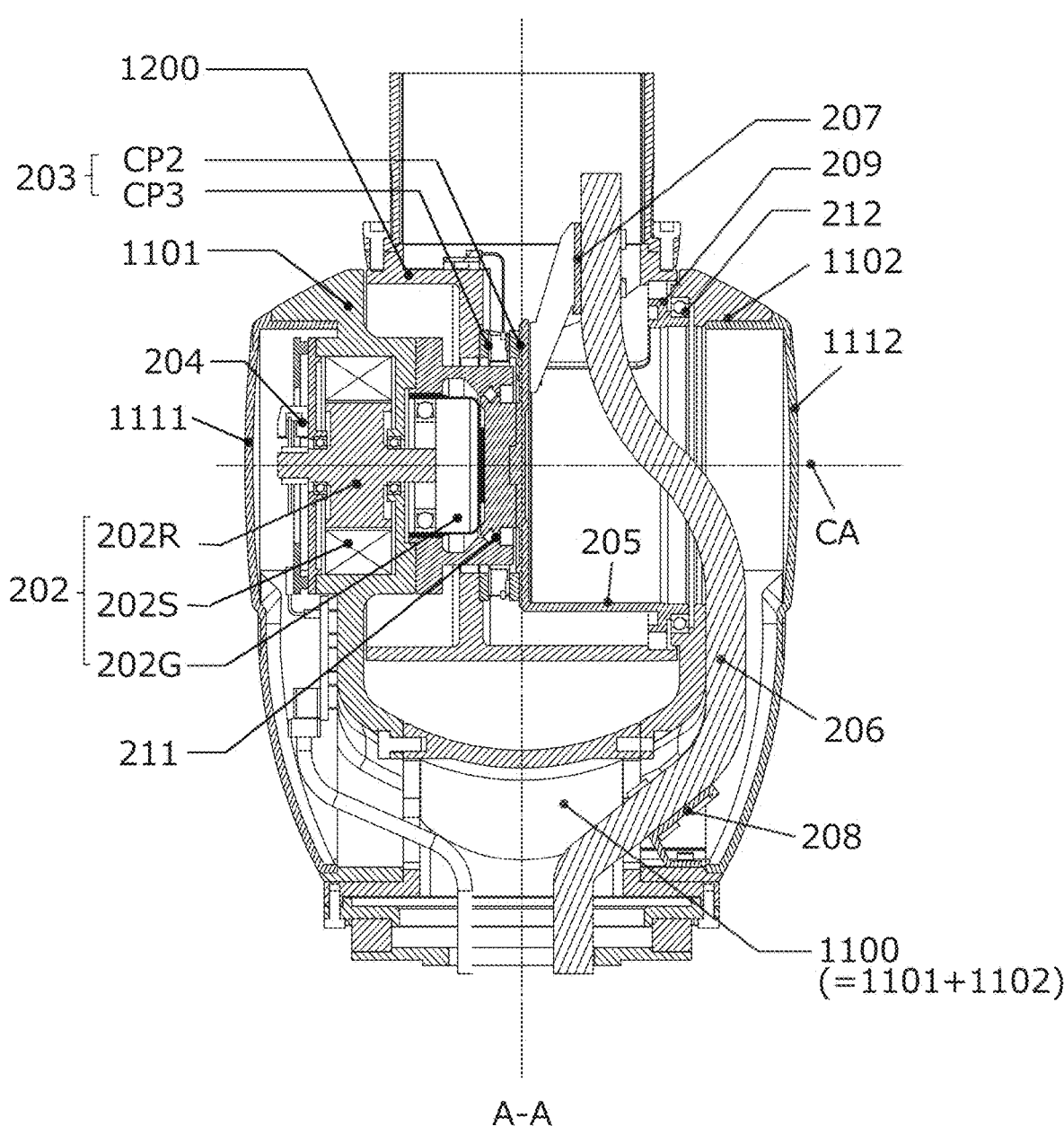
FIG. 4 is a cross-sectional view for illustrating the structure of the joint mechanism 200.

FIG. 4 is a cross-sectional view for illustrating the structure of the joint mechanism 200 and illustrates a cross section taken along a line A-A of the side view illustrated in FIG. 3B. The joint mechanism 200 includes a side-face cover member 1111 and a side-face cover member 1112 for protecting the interior of the joint mechanism 200. In addition, the joint mechanism 200 accommodates a wiring-and-pipe portion 206.

Figure 5:
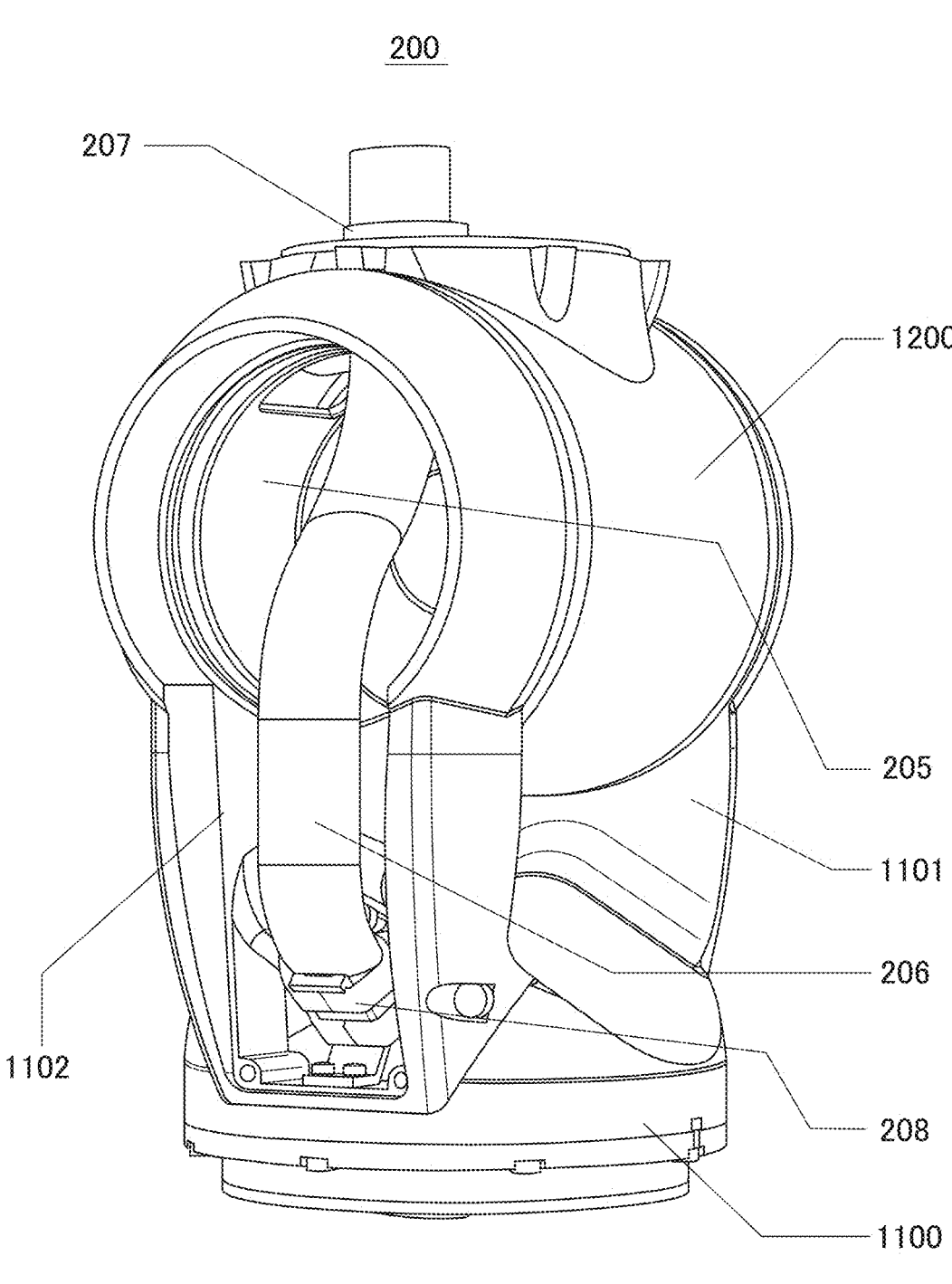
FIG. 5 is a diagram illustrating a state where a side-face cover member 1112 is removed.
Figure 6:
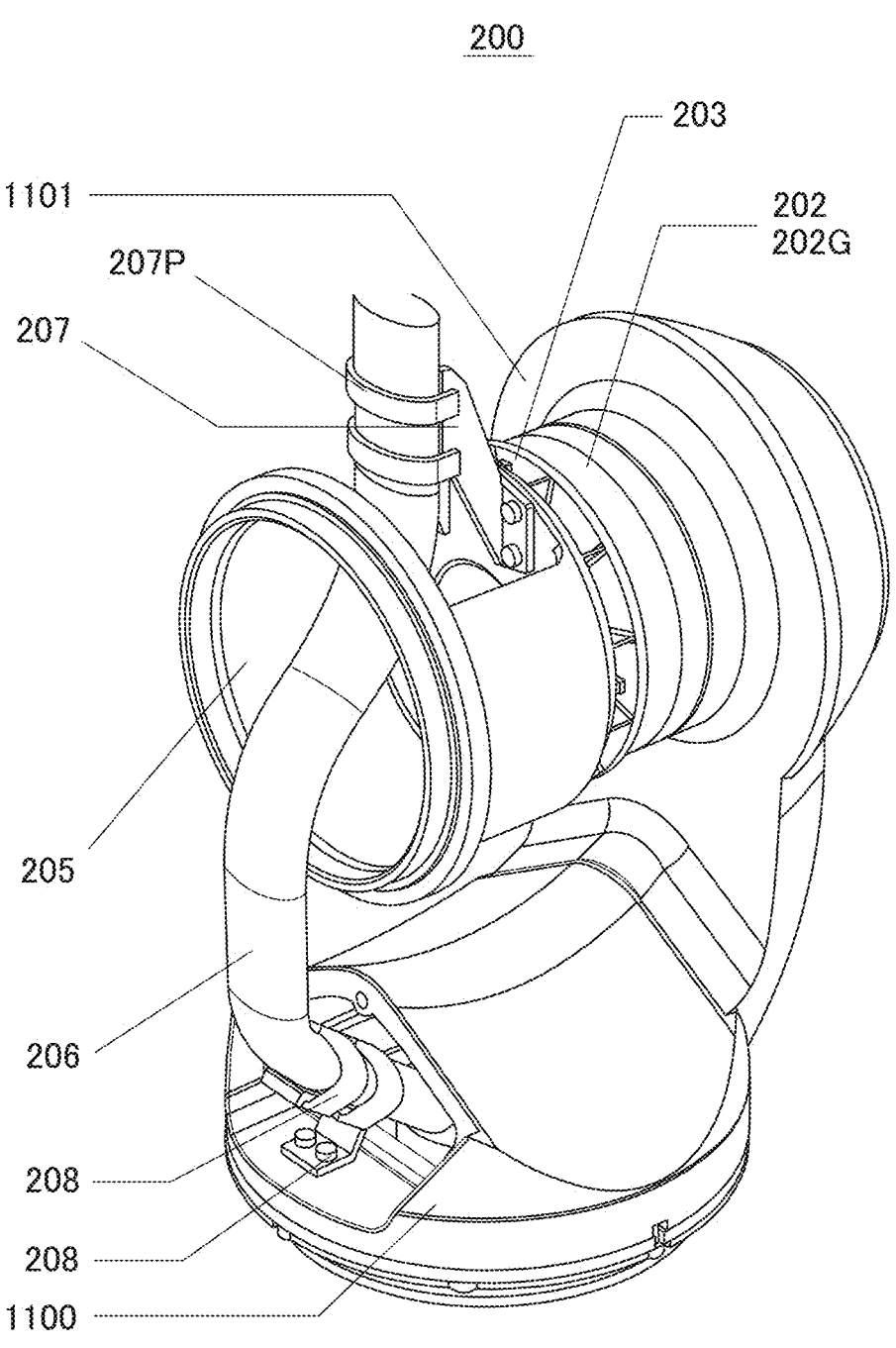
FIG. 6 is a perspective view of an external appearance of the internal configuration of the joint mechanism 200, obtained by removing some components from the joint mechanism 200.

Each of FIGS. 5 and 6 is a perspective view in which some components are removed from the joint mechanism 200 for illustrating a three-dimensional shape of each component of the joint mechanism 200. FIG. 5 illustrates a state where the side-face cover member 1112 of the joint support member 1102 is removed, for showing the internal wiring, or the wiring-and-pipe portion 206, disposed in the interior of the joint mechanism. FIG. 6 is a perspective view of an external appearance of the internal structure of the joint mechanism 200, in which the second link 1200, which is an output link, the second bearing mechanism 212, and the joint support member 1102 are further removed for specifically describing the method of fixing the wiring-and-pipe portion 206.

Hereinafter, a structure of each component of the joint mechanism 200 will be described in a sequential manner. In the joint mechanism 200, the first link 1100, which is a fixed-end-side link, and the second link 1200, which is an output-side link, are linked with each other via the first bearing mechanism 211 and the second bearing mechanism 212, which are joint support mechanisms, such that the first link 1100 and the second link 1200 can rotate freely with respect to each other.

The first link 1100 includes the two support members: the joint support member 1101 and the joint support member 1102. The joint support member 1101 is connected to the first bearing mechanism 211, and the joint support member 1102 is connected to the second bearing mechanism 212.

The first bearing mechanism 211 and the second bearing mechanism 212 retain the second link 1200 with respect to the first link 1100 such that the second link 1200 can only rotate around the driving shaft of the joint with respect to the first link 1100. Suitably, a cross-roller bearing is used as the first bearing mechanism 211, and a ball bearing (ball bearing) is used as the second bearing mechanism 212. However, the bearings used in the embodiment are not limited to the above-described components. For example, a plurality of angular bearings may be used. In another case, bearing mechanisms having other structures may be used, combined with each other.

On the joint support member 1101 side in the first link 1100, components of the driving mechanism necessary for driving the joint are disposed. Next, the arrangement of the components, the operation for driving the joint, and the principle of operation for measuring the torque will be described.

The driving portion 202 is a driving portion that generates a rotation torque applied between the first link 1100 and the second link 1200; and it includes an electric motor including a stator 202S and a rotor 202R, and a reduction mechanism 202G. The rotor 202R is the output end to which the motor power is outputted, and it is connected to the input end of the reduction mechanism 202G. The electric motor may be a built-in motor. In this case, a frame member of the link serves also as the casing of the electric motor.

At an end portion of the electric motor, a rotary encoder 204 is disposed. The rotary encoder 204 measures the rotation angle of the electric motor and sends the measurement data to the control apparatus 3. The driving portion 202 includes a brake mechanism (not illustrated) for keeping the motor rotation angle. In addition, wiring cables are connected to the driving portion 202 for driving the motor, sending/receiving signals to/from the rotary encoder, and controlling the opening-and-closing operation of the brake.

Preferably, the reduction mechanism 202G may be a strain-wave-gearing mechanism that includes three components: an input end, an output portion, and a fixed portion. The reduction ratio may be 1:80, but it may be changed as appropriate. In the present embodiment, the inner ring of the cross-roller bearing, which is the first bearing mechanism 211, is integrated with the output portion of the reduction mechanism 202G, and the outer ring of the cross-roller bearing is integrated with the fixed portion of the reduction mechanism 202G. The rotor 202R of the electric motor, which is a driving source, rotates the input end of the reduction mechanism 202G. The reduction mechanism 202G increases the torque generated by the electric motor, by the reduction ratio; and decreases the rotation angle by the reduction ratio. Thus, the reduction mechanism 202G outputs the increased rotation torque from the output portion. The torque generated by the electric motor is increased, by the reduction mechanism 200, to a level that is suitable for driving the joint; and the torque outputted from the reduction mechanism 202G actively rotates the second link 1200 supported by the joint support mechanism (bearing).

In general, the torque efficiently generated by a small electric motor is much smaller than the torque required to drive a joint, and the rated rotational speed generated by a small electric motor is much higher than the rotational speed required to rotate the output shaft of the joint. Thus, most of the robots generally include the reduction mechanism with a high reduction ratio of about 1:30 to 1:200. In this case, the driving mechanism has higher torque loss due to the friction and rotation resistance caused by the reduction of speed. Thus, the rotation torque applied to the output-side link of the joint mechanism cannot be detected with high accuracy by merely measuring the motor torque. Even if the motor current is measured instead of directly measuring the motor torque, the rotation torque applied to the output-side link of the joint mechanism cannot be detected with high accuracy. Since it is difficult to perform the precise modeling for the torque loss, and to obtain the sufficient reproducibility of the torque loss, it is also difficult to estimate the torque loss and correct the output torque of the electric motor. For this reason, it is necessary to accurately measure the torque applied to the output-side link of the joint mechanism, by using the torque sensor.

As described above, in the present embodiment, the output side of the driving portion 202 (i.e., the output side of the reduction mechanism) is connected to the sensor connection member 205 via the connection portion CP1. The sensor connection member 205 is connected to one end of the torque sensor 203 via the connection portion CP2, and the other end of the torque sensor 203 is connected to the second link 1200 via the connection portion CP3. The rotation torque outputted by the driving portion 202 is transmitted to the second link 1200 via the torque sensor 203.

Figure 7A:
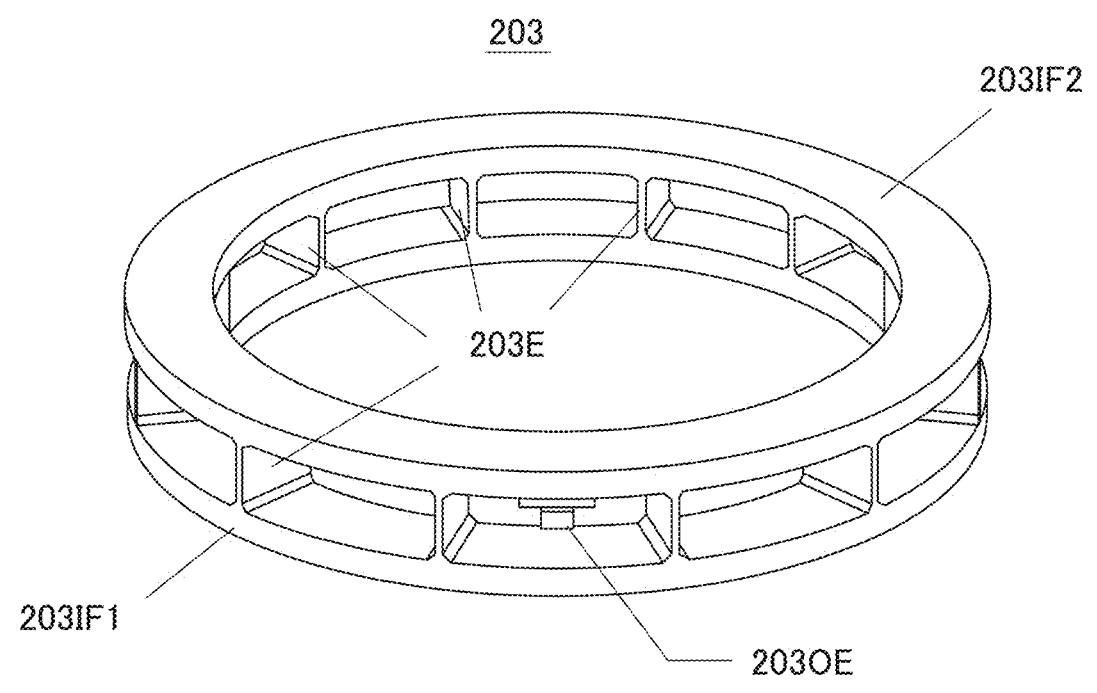
FIG. 7A is a diagram illustrating an external shape of one example of a torque sensor.
Figure 7B:
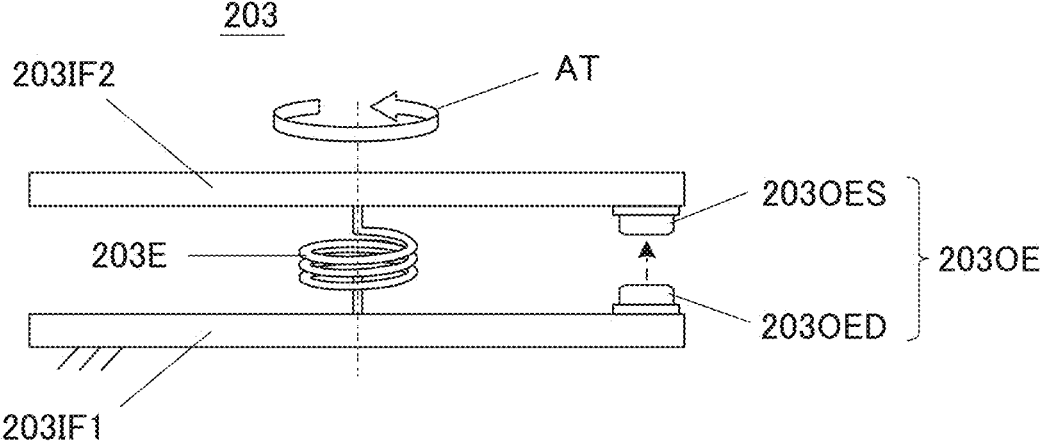
FIG. 7B is a schematic diagram for illustrating the principle of operation and a configuration of the torque sensor.

FIG. 7A illustrates an external shape of one example of the torque sensor 203. FIG. 7B is a schematic diagram for illustrating the principle of operation and a configuration of the torque sensor. As illustrated in FIG. 7A, the torque sensor 203 includes two disk-like members 203IF1 and 203IF2 disposed so as to face each other, and the two disk-like members are linked with each other, formed as one body, via a plurality of beam-like members 203E. One of the disk-like member 203IF1 and 203IF2 may be referred to as a first end of the torque sensor, and the other may be referred to as a second end of the torque sensor.

Each of the disk-like members 203IF1 and 203IF2 includes fixing bolt holes (not illustrated) used for mechanically connecting the disk-like member to a component disposed in front of or behind the torque sensor in the torque transmission path.

Each of the beam-like members 203E is an elastic member formed like a thin plate so that the beam-like member has lower rigidity than that of the disk-like members 203IF1 and 203IF2. The disk-like members 203IF1 and 203IF2 are linked with each other, with the plurality of (e.g., twelve) elastic members formed like thin plates being disposed radially.

The torque sensor 203 includes an encoder 203OE that serves as a displacement measurement device. That is, a displacement detection detector 203OED is disposed on the disk-like member 203IF1, and a scale 203OES is disposed on the disk-like member 203IF2. The displacement detection detector 203OED and the scale 203OES are disposed so as to face each other, and function as an optical encoder that measures a relative displacement between the two disk-like members.

The torque sensor 203 includes a plurality of (e.g., three) sets of the optical encoder mounted in the torque sensor 203. The torque sensor 203 can convert the displacement, measured as described above, to the torque applied to the torque sensor 203; and output the torque value to the control apparatus. In this case, the torque sensor 203 converts the displacement to the torque value by performing a digital signal processing for multiplying the output from each encoder with a sensor stiffness matrix.

That is, the torque sensor 203 detects the rotation torque applied to the torque sensor 203, by measuring a relative displacement (along the circumferential direction) between the two disk-like members produced when a rotation torque AT around the center axis is applied due to the external force. In other words, the torque sensor 203 is a sensor that obtains the information on the torque applied between the first end and the second end.

Referring back to FIG. 4, in the first link 1100, the joint support member 1101 and the joint support member 1102 are joined with each other via bolts, and the joint support member 1102 holds the second bearing mechanism 212. As illustrated in FIG. 1 and FIGS. 4 to 6, the sensor connection member 205 has a shape (e.g., a cylindrical shape) formed like a cylinder that extends in the direction of the rotation center axis CA of the joint mechanism. One end portion of the sensor connection member 205 that extends from the connection portion between the sensor connection member 205 and the driving portion 202, is supported by the second bearing mechanism 212 disposed between the one end portion and the first link 1100.

Preferably, a dustproof-and-waterproof structure is used in the present embodiment, and in the structure, sealing is performed on the clearance between the sensor connection member 205 and the second link 1200. For example, like a seal member 209 illustrated in FIG. 4, a seal member, such as an O-ring or an oil seal, that is relatively elastic may be disposed. One of the features of the joint mechanism of the present embodiment is that the torque measurement performance does not significantly deteriorate even if such a sealing structure is used.

Next, a method of disposing the wiring member in the interior of the joint in the joint mechanism of the embodiment will be described. As illustrated in FIG. 4, the first link 1100 includes the two support members: the joint support member 1101 disposed on the left side in FIG. 4 and the joint support member 1102 disposed on the right side in FIG. 4. In the internal space of the joint mechanism defined by the side-face cover members 1111 and 1112, the driving portion 202 is disposed on the joint support member 1101 side, whereas the wiring-and-pipe portion 206 is accommodated on the joint support member 1102 side. In such arrangement, the wiring can be accommodated, on a large scale, in the internal space of the joint.

The wiring-and-pipe portion 206 illustrated in FIGS. 4 to 6 is a bundle in which the power lines for driving motors of the joints, signal lines connected to the sensors, fluid pipes, if used, for driving the actuators, and the like are tied together. In the wiring-and-pipe portion 206 disposed in each joint, a wiring-and-pipe portion that extends to a joint on the distal-end side of the joint or to the end effector is tied.

The wiring-and-pipe portion 206 inserted in the internal space of the joint mechanism 200 is fixed to the joint support member 1102 of the first link 1100 via a base-end-side fixing portion 208. In addition, the wiring-and-pipe portion 206 is guided to the second link 1200 side through the interior of the sensor connection member 205 that has a cylindrical shape, and it is fixed to a wiring-support mechanism 207 in the vicinity of the second link 1200.

As illustrated in FIG. 6, the wiring-support mechanism 207 is fixed to the sensor connection member 205. In the sensor connection member 205 formed like a cylinder that has a relatively large diameter, an opening portion is formed in one portion of the side face of the cylinder for forming a path through which the wiring-and-pipe portion 206 passes. Through the opening portion, the wiring-and-pipe portion 206 is guided into the interior of the second link 1200.

As illustrated in FIGS. 4 to 6, the sensor connection member 205 is formed like a cylinder that has a relatively large diameter, and the wiring-and-pipe portion 206 is fixed to the sensor connection member 205 by using the wiring-support mechanism 207, at a fixed position 207P separated from the rotation center of the joint and positioned on the second link side. In this configuration, when the joint swings, the wiring-and-pipe portion 206 can bend while not being prevented from moving by interference between the wiring-and-pipe portion 206 and other members, and it can be supported stably without producing any excessive stress.

In addition, in the present embodiment, since the wiring-and-pipe portion 206 is supported in the interior of the joint in this manner, the torque sensor 203 does not receive the reaction force produced by the wiring members that bend in accordance with the swing of the joint. Thus, the torque sensor 203 can measure the joint torque with high accuracy and high sensitivity. This is because the reaction force produced by the wiring members is applied to the sensor connection member 205 and does not affect the torque applied to the torque sensor 203. Thus, it is not necessary to complicate the control of the robot. For example, it is not necessary to predetermine the reaction force, produced in the wiring-and-pipe portion, by conducting an experiment, and store the reaction-force data in the control portion of the robot, as correction data. In addition, it is not necessary to correct the driving force by causing the control portion to compute the reaction force, produced in the wiring-and-pipe portion, by using the bending angle and the bending speed of the joint. Thus, the torque of the joint mechanism can be controlled with high sensitivity and high accuracy, without using any complicated control method.

The configuration of the joint mechanism 200 that is included in the robot 2 and that can swing has been described specifically. As described with reference to FIG. 1, the joint mechanisms 300 and 500 are also joint mechanisms that can swing, and the basic configuration of the joint mechanisms 300 and 500 is the same as that of the joint mechanism 200.

Figure 9A:
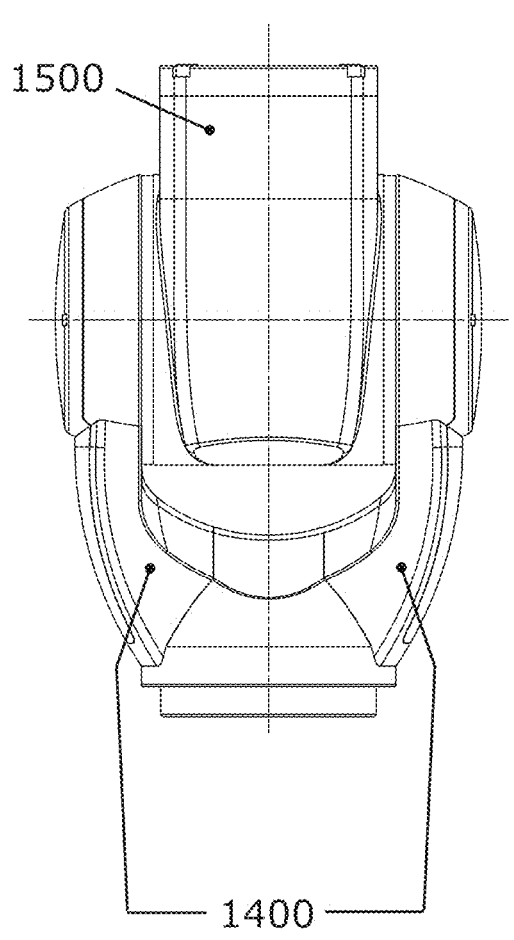
FIG. 9A is a front view for illustrating an external shape of a joint mechanism 500.
Figure 9B:
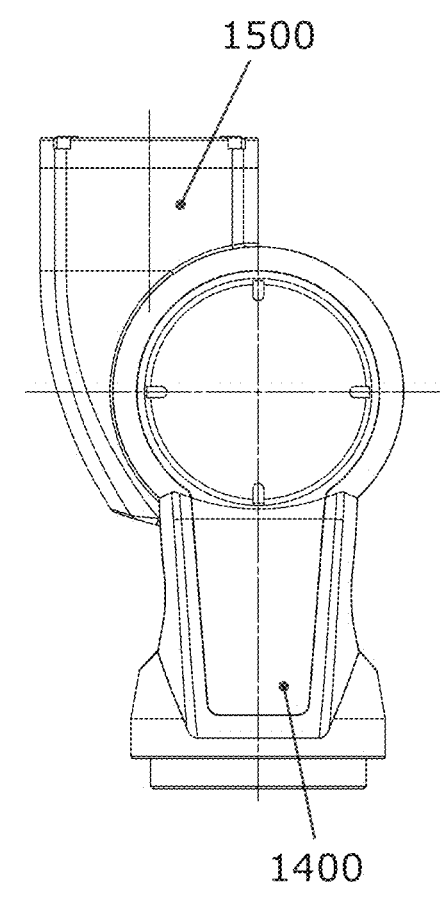
FIG. 9B is a side view for illustrating the external shape of the joint mechanism 500.

FIG. 8A is a front view for illustrating an external shape of the joint mechanism 300, and FIG. 8B is a side view for illustrating the external shape of the joint mechanism 300. FIG. 9A is a front view for illustrating an external shape of the joint mechanism 500, and FIG. 9B is a side view for illustrating the external shape of the joint mechanism 500. Although the external shapes of the joint mechanisms 300 and 500 are different from the external shape of the joint mechanism 200, the joint mechanisms 300 and 500 produce the same effects as those of the joint mechanism 200 in the method of support by using the sensor connection member, the method of disposing the seal member, and the method of supporting the wiring-and-pipe portion.

Modification

Note that the present invention is not limited to the above-described embodiment and can be variously modified within the technical concept of the present invention.

In the embodiment as illustrated in FIG. 1, the first bearing mechanism 211 and the second bearing mechanism 212, which rotatably support the output link in the double-ends-supported structure, are disposed in the driving-portion-side torque transmission path that is positioned on the driving portion 202 side with respect to the torque sensor 203 in the torque transmission path. However, the method of disposing the bearing mechanism in the embodiment is not limited to the above-described example as long as the bearing mechanism is not disposed in the output-link-side torque transmission path that is positioned on the second link 1200 side with respect to the torque sensor 203.

Figure 10:
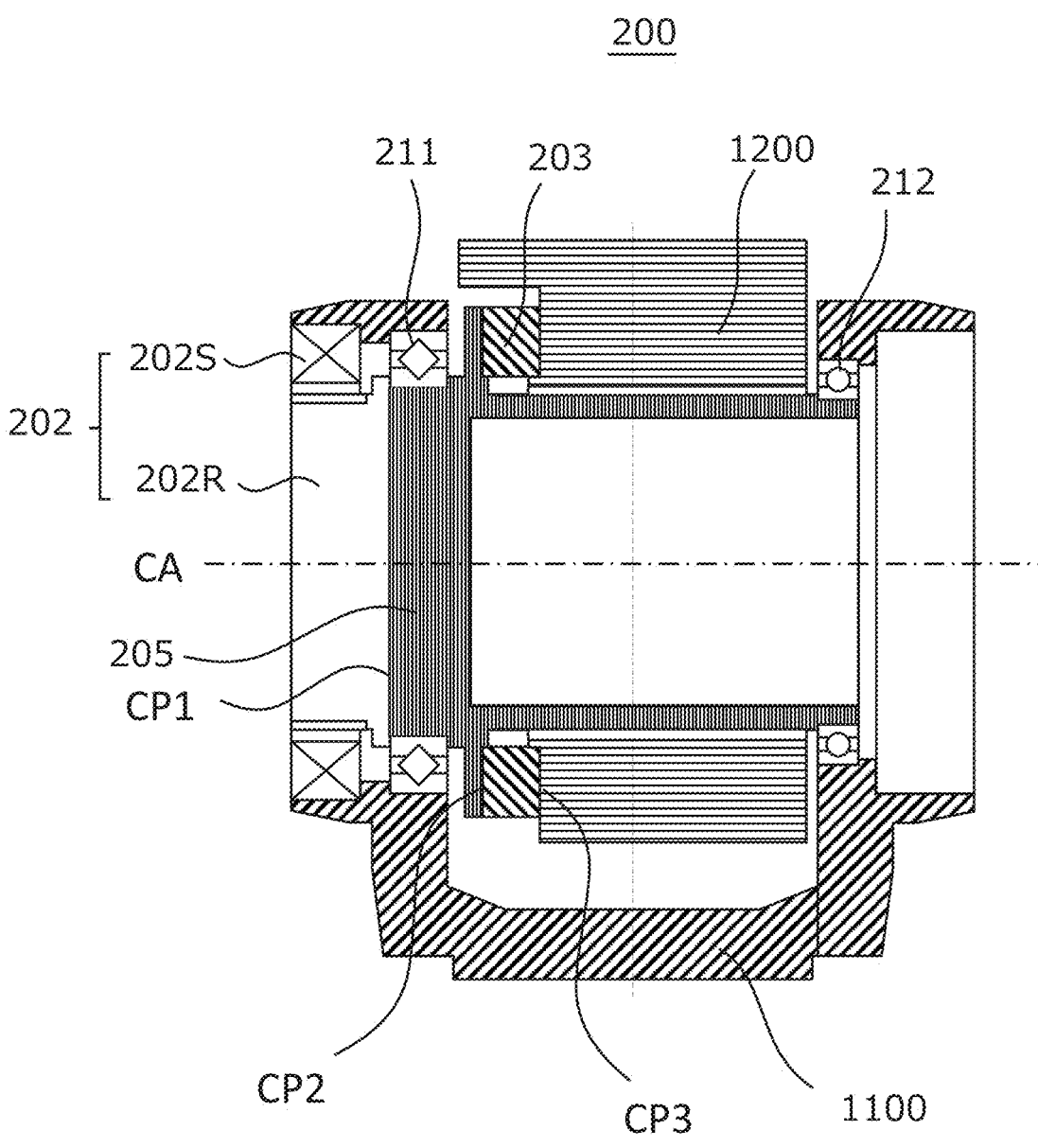
FIG. 10 is a cross-sectional view illustrating an embodiment in which a first bearing mechanism 211 supports a sensor connection member 205 such that the sensor connection member 205 can rotate with respect to a first link 1100.

The first bearing mechanism 211 may support the rotor 202R of the electric motor of the driving portion 202 such that the rotor 202R can rotate, or it may support the output portion of the reduction mechanism 202G of the driving portion 202 such that the output portion can rotate. In another case, as illustrated in a cross-sectional view illustrated in FIG. 10, the first bearing mechanism 211 may support the sensor connection member 205 such that the sensor connection member 205 can rotate with respect to the first link 1100.

In another case, three or more bearing mechanisms may be disposed in a single joint for making the joint have more firm structure, as long as the bearing mechanisms are not disposed in the output-link-side torque transmission path that is positioned on the second link 1200 side with respect to the torque sensor 203.

In the driving portion described as an example, the electric motor and the reduction mechanism are used, combined with each other. However, the configuration of the driving portion is not limited to this. For example, a motor with a direct drive system that does not use the reduction mechanism may be used. In addition, the electric motor is not limited to the built-in motor, which has a configuration in which a frame member of the link serves also as the casing of the electric motor. In addition, the source for supplying the driving torque is not limited to the electric motor. For example, a driving portion with a fluid drive system, which uses air pressure, oil pressure, or the like, may be used, depending on the required output level or output characteristic.

The torque sensor is not limited to the configuration described as an example. For example, the torque sensor may be formed integrally with another component that constitutes the joint. For example, the wiring-support portion and the primary connection portion of the torque sensor may be formed integrally with each other, and the secondary connection portion of the torque sensor and the second link may be connected with each other via another member. In another case, the wiring-support portion may be formed integrally with the output mechanism of the driving portion.

The robot of the embodiment is not limited to the robot illustrated in FIG. 2 and including the vertically articulated arm with six axes. For example, the robot may be any one of various types of robots including a vertically articulated robot with a different number of axes, a parallel link robot, and a prismatic joint robot.

The motion of the robot apparatus that includes the joint mechanism of the embodiment is typically a motion for a process of manufacturing products, such as assembly work, conveyance work, machining work (including cutting, grinding, drilling, coating, bonding, and welding), and cleaning work. However, motions other than the above-described motions may be performed by the robot apparatus.

The joint mechanism of the embodiment is applicable to various machines and facilities including industrial robots, service robots, machine tools operated under the numerical control performed by a computer. For example, the joint mechanism can be applied to the joint of a machine or a facility that can automatically perform expansion and contraction motion, bending and stretching motion, up-and-down motion, right-and-left motion, pivot motion, or combination motion thereof, depending on the information data stored in the storage device of the control device. Any control method or control program for moving the robot that includes the joint mechanism of the embodiment, and any recording medium that can be read by a computer that stores the control program are included in the embodiment of the present invention.

In the present invention, the torque applied to the output link can be detected with high accuracy in a case where the output link is supported via a plurality of bearings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-151610, filed Sep. 19, 2023, which is hereby incorporated by reference herein in its entirety.

What is claimed is:

1. A driving apparatus configured to displace a second link with respect to a first link, the driving apparatus comprising:
   a driving portion including an output portion configured to output a driving force that displaces the second link;
   a sensor configured to obtain information on force;
   a connection member configured to connect the output portion and the sensor;
   a first bearing; and
   a second bearing,
   wherein the sensor is connected between the second link and the connection member,
   wherein the first bearing is provided on the first link and is connected to the output portion to rotatably support the output portion with respect to the first link or connected to the connection member to rotatably support the connection member with respect to the first link, and
   wherein the second bearing is provided on the first link and is connected to the connection member to rotatably support the connection member with respect to the first link.

2. The driving apparatus according to claim 1, wherein the first bearing and the second bearing are disposed on the driving portion side with respect to the sensor in a force transmission path from the driving portion to the second link.

3. The driving apparatus according to claim 1, wherein the connection member includes a cylindrical portion that extends from the first bearing toward the second bearing.

4. The driving apparatus according to claim 1, wherein the connection member is disposed in an interior of the second link, with a clearance being formed between the connection member and the second link.

5. The driving apparatus according to claim 1, wherein at least one portion of the second link is positioned between the first bearing and the second bearing.

6. The driving apparatus according to claim 1, wherein the driving portion includes an electric motor, and the first bearing is configured to support a rotor of the electric motor and the first link.

7. The driving apparatus according to claim 1, wherein the driving portion includes a reduction mechanism, and the first bearing is configured to support an output portion of the reduction mechanism and the first link.

8. The driving apparatus according to claim 1, wherein the connection member includes a fixing portion configured to fix a line that extends from the first link to the second link.

9. The driving apparatus according to claim 8, wherein the connection member is cylindrical, the fixing portion is positioned at a fixed position on the second link side, and the line is fixed by the fixing portion.

10. The driving apparatus according to claim 1, further comprising a seal member disposed between the connection member and the second link.

11. The driving apparatus according to claim 1, wherein at least one of the first bearing and the second bearing includes any one of a roller bearing or a ball bearing.

12. The driving apparatus according to claim 1, wherein the second link is configured to be displaced around a rotation axis, and wherein when viewed along the rotation axis, the first bearing and the second bearing are spaced from each other.

13. The driving apparatus according to claim 1, wherein the first bearing and the second bearing are provided so as not to come into contact with the second link.

14. A method of controlling a driving apparatus that displaces a second link with respect to a first link, the method comprising: controlling, by a control portion, a driving portion, based on an information on force obtained by a sensor, wherein the driving apparatus includes;

the driving portion including an output portion configured to output a driving force that displaces the second link;

the sensor configured to obtain information on force;

a connection member configured to connect the output portion and the sensor;

a first bearing; and a second bearing, and wherein the sensor is connected between the second link and the connection member, wherein the first bearing is provided on the first link and is connected to the output portion to rotatably support the output portion with respect to the first link or connected to the connection member to rotatably support the connection member with respect to the first link, and wherein the second bearing is provided on the first link and is connected to the connection member to rotatably support the connection member with respect to the first link.

15. A computer-readable recording medium storing a program that causes the control portion to execute the method according to claim 14.

16. A robot configured to displace a second link with respect to a first link, the robot comprising:

a driving portion including an output portion configured to output a driving force that displaces the second link;

a sensor configured to obtain information on force;

a connection member configured to connect the output portion and the sensor;

a first bearing; and a second bearing, wherein the sensor is connected between the second link and the connection member wherein the first bearing is provided on the first link and is connected to the output portion to rotatably support the output portion with respect to the first link or connected to the connection member to rotatably support the connection member with respect to the first link, and wherein the second bearing is provided on the first link and is connected to the connection member to rotatably support the connection member with respect to the first link.

17. A method of manufacturing products by controlling the robot according to claim 16 and by performing work for manufacturing the products.

18. The method of manufacturing products according to claim 17, wherein the work includes at least one of conveyance work, assembly work, machining work, and cleaning work for a component.

19. A method of controlling a robot that displaces a second link with respect to a first link, the method comprising: controlling, by a control portion, a driving portion, based on an information on force obtained by a sensor, wherein the robot includes;

the driving portion including an output portion configured to output a driving force that displaces the second link;

the sensor configured to obtain information on force;

a connection member configured to connect the output portion and the sensor;

a first bearing; and a second bearing, and wherein the sensor is connected between the second link and the connection member, wherein the first bearing is provided on the first link and is connected to the output portion to rotatably support the output portion with respect to the first link or connected to the connection member to rotatably support the connection member with respect to the first link, and wherein the second bearing is provided on the first link and is connected to the connection member to rotatably support the connection member with respect to the first link.

* * * * *